(12) United States Patent
O'Keeffe et al.

(10) Patent No.: US 8,665,845 B2
(45) Date of Patent: Mar. 4, 2014

(54) COMMUNICATION SYSTEM, NETWORK ELEMENT AND METHOD FOR ANTENNA ARRAY BEAM-FORMING

(75) Inventors: Conor O'Keeffe, Douglas (IE); Joe Moore, Terenure (IE)

(73) Assignee: Socowave Technologies Limited (IE)

( * ) Notice: Subject to any disclaimer, the term of this patent is extended or adjusted under 35 U.S.C. 154(b) by 321 days.

(21) Appl. No.: 13/201,559

(22) PCT Filed: Feb. 12, 2010

(86) PCT No.: PCT/EP2010/051824
§ 371 (c)(1),
(2), (4) Date: Oct. 18, 2011

(87) PCT Pub. No.: WO2010/092166
PCT Pub. Date: Aug. 19, 2010

(65) Prior Publication Data
US 2012/0026998 A1      Feb. 2, 2012

(30) Foreign Application Priority Data

Feb. 13, 2009 (GB) .................................. 0902408.4

(51) Int. Cl.
*H04W 4/00* (2009.01)
*H04B 7/14* (2006.01)
(52) U.S. Cl.
USPC ................. 370/338; 370/328; 455/21; 455/22
(58) Field of Classification Search
USPC ................. 370/328, 338; 455/21, 22
See application file for complete search history.

(56) References Cited

U.S. PATENT DOCUMENTS

| | | | |
|---|---|---|---|
| 4,607,389 A | 8/1986 | Halgrimson | |
| 6,016,124 A * | 1/2000 | Lo et al. | 342/373 |
| 8,107,569 B2 * | 1/2012 | Chang | 375/347 |
| 2002/0154687 A1 * | 10/2002 | Bierly et al. | 375/222 |
| 2003/0040336 A1 | 2/2003 | Waylett et al. | |
| 2004/0127168 A1 * | 7/2004 | Ito | 455/82 |
| 2007/0285312 A1 | 12/2007 | Gao et al. | |
| 2008/0075033 A1 * | 3/2008 | Shattil | 370/328 |
| 2008/0280581 A1 * | 11/2008 | Rofougaran et al. | 455/296 |
| 2009/0115650 A1 * | 5/2009 | Tietjen et al. | 341/141 |

FOREIGN PATENT DOCUMENTS

| | | |
|---|---|---|
| EP | 1049195 | 11/2000 |
| WO | 9744908 | 11/1997 |

* cited by examiner

*Primary Examiner* — Kenny Lin
(74) *Attorney, Agent, or Firm* — Barnes & Thornburg LLP

(57) ABSTRACT

A network element for a wireless communication system is locatable to couple at least one base station to an antenna array. The network element comprises at least one receiver arranged to receive a radio frequency signal from the at least one base station or the antenna array and modem logic operably coupled to the at least one receiver. The modem logic comprises radio frequency conversion circuitry arranged to down-convert a received radio frequency signal to a baseband signal; analogue-to-digital conversion logic arranged to convert the baseband signal to digitized signals; and beam-form processing logic arranged to perform active beam-forming adjustment on the digitized signals. The modem logic further comprises digital-to-analogue conversion logic arranged to convert the beam-form adjusted digitized signals to analogue signals and radio frequency conversion circuitry arranged to up-convert the analogue signals to a radio frequency radio signal for forwarding to the antenna array or the at least one base station.

20 Claims, 10 Drawing Sheets

COMMUNICATION SYSTEM, NETWORK ELEMENT AND METHOD FOR ANTENNA ARRAY BEAM-FORMING

FIELD OF THE INVENTION

The field of the invention relates to active antenna array control in wireless communication systems and in particular, but not exclusively, to a network element feed for use in the active antenna beam forming.

BACKGROUND OF THE INVENTION

Currently, 3rd generation (3G) cellular communication systems are being developed to further enhance the communication services provided to mobile phone users. The most widely adopted 3rd generation communication systems are based on Code Division Multiple Access (CDMA) technology. Carrier frequencies are used for both uplink transmissions, i.e. transmissions from a mobile wireless communication unit (often referred to as wireless subscriber communication unit or user equipment in $3^{rd}$ generation systems) to the communication infrastructure via a wireless serving base station (often referred to as a Node-B in $3^{rd}$ generation systems) and downlink transmissions, i.e. transmissions from the communication infrastructure to the mobile wireless communication unit via a wireless serving base station (e.g. Node-B). A further description of CDMA, and specifically of the Wideband CDMA (WCDMA) mode of Universal Mobile Telecommunication System (UMTS), can be found in 'WCDMA for UMTS', Harri Holma (editor), Antti Toskala (Editor), Wiley & Sons, 2001, ISBN 0471486876.

CDMA communication, as used in 3G mobile communications air interface technologies, is an 'interference limited' technology from a data throughput perspective. CDMA technology utilises orthogonal variable spreading factor (OVSF) codes combined with pseudo noise (Pn) codes to differentiate multiple UEs that are utilising the same spectrum at the same time for uplink access on the Uu radio interface. In order to maintain sufficient signal-to-interference ratio (SIR) protection for all UEs on accessing the Node-B, up-link (UL) power control (PC) is dynamically managed by the network infrastructure. SIR estimation is commonly derived from pilot tones in the uplink (UL) dedicated paging control channel (DPCCH). User equipment (UE) devices transmitting to a Node-B on the same spreading factor (SF) would be arranged such that their respective transmissions have substantially the same power when received at the receiving Node-B. Often, up to ninety six UEs are simultaneously supported in call mode for a specific Node-B.

Referring now to FIG. 1, a known cellular-based communication system 100 is shown in outline. The cellular-based communication system 100 is compliant with, and contains network elements capable of operating over, an universal mobile telecommunication system (UMTS) air-interface.

A plurality of wireless subscriber communication units/terminals (or user equipment (UE) in UMTS nomenclature) 105 communicate over radio links with a plurality of base transceiver stations, referred to under UMTS terminology as Node-Bs, 115 supporting communication coverage over a particular communication cell 110.

The wireless communication system, sometimes referred to as a Network Operator's Network Domain, is connected to an external network 140, for example the Internet. The Network Operator's Network Domain includes:

(i) A core network, namely at least one Gateway General Packet Radio System (GPRS) Support Node (GGSN) 125 and at least one Serving GPRS Support Node (SGSN) 130; and (ii) An access network, comprising a UMTS Radio network controller (RNC) 120; and at least one UMTS Node-B 115, where each RNC 120 may control one or more Node-Bs 115.

The GGSN 125 or SGSN 130 is responsible for UMTS interfacing with a Public network, for example a Public Switched Data Network (PSDN) (such as the Internet) 140 or a Public Switched Telephone Network (PSTN). The SGSN 130 performs a routing and tunnelling function for traffic, whilst a GGSN 125 links to external packet networks. Each SGSN 130 provides a gateway to the external network 140. The Operations and Management Centre (OMC) is operably connected to RNCs 120 and Node-Bs 115. The OMC comprises processing functions and logic functionality in order to administer and manage sections of the cellular communication system 100, as is understood by those skilled in the art.

The Node-Bs 115 are connected to external networks, through Radio Network Controller (RNC) stations, including RNC 120 and mobile switching centres (MSCs), such as SGSN 130. The function of the Node-B 115 is to communicate with the RNC 120 and perform chip rate processing on the data signals. A cellular communication system will typically have a large number of such infrastructure elements where, for clarity purposes, only a limited number are shown in FIG. 1.

Referring now to FIG. 2, a known antenna station is illustrated. The antenna station comprises a Node-B (base station) 115 located in a building enclosure 202 to protect the Node-B circuitry from the environment/elements. Each Node-B 115 contains one or more transceiver units and communicates with the rest of the cell-based system infrastructure via an $I_{ub}$ interface (not shown), as defined in the UMTS specification. Each Node-B 115 is operably coupled to an antenna mast 117 for transmitting and receiving signals to/from remote UEs 105, where each antenna mast 117 comprises one or more antenna(e) that may be in a form of an antenna array 119. The Node-B 115 includes rake receivers and modulation/demodulation circuits for encoding transmit signals and decoding received signals. The Node-B 115 also includes clock reference generation to assist the chip rate processing as well as for use in the baseband (BB) and radio frequency (RF) subsystems. RF subsystem functionality of the Node-B provides analogue-to-digital conversion and digital-to-analogue conversion of the receive and transmit signals.

Existing beam forming techniques utilise a single antenna feed from the Node-B 115 to the antenna (or antenna array) 119 and use passive phase shifters and power splitters to generate fixed weightings on each antenna of the antenna arrays.

It is known that some legacy Node-Bs 115 may also provide some control signals to the tower top antenna 119. These control signals are generated centrally by the OMC (illustrated in FIG. 1) and provide for limited electro-mechanical control of the antenna 119, for example mechanical tilt actuation of the antenna 119, controlling gain in tower top receive low noise amplifiers (LNAs), etc.

In the field of wireless mobile communications, replacement of Network infrastructure components and elements, such as specifically a replacement of Node-B (base station) or elements thereof, requires significant engineering effort. In particular, significant effort and testing of the installed components or elements, as well as the impact on the other infrastructure elements that the replacement equipment is connected to, is required to ensure that the operational performance due to the integration of the upgraded equipment is optimised. For example, for a replacement Node-B, such testing would include assessing changes in the Network Operations and Management Centre (OMC), Node-B baseband control plus data interface as well as the impact on the Node-B's radio frequency (RF) components and performance as well as any effect on the antennae or antenna arrays used. Thus, the upgrade requires a co-ordinated effort between infrastructure vendors and Network Operators, and all the associated costs. Thus, replacement of equipment or components is not always feasible.

Referring back to FIG. 2 illustrates a Node-B enclosure 102 that is located adjacent an antenna mast 117 that comprises the antenna array 119 located substantially near or at the top of the antenna mast 117. The Node-B 115 communicates with the antenna array 119 via fixed cabling in a form of co-axial cables 114.

The losses in RF signal strength of this cabling are typically in the order of 6 dB. Hence, for a 20 Watt (+43 dBm) effective radiated power (ERP), a 100 W (+50 dBm) RF power amplifier (PA) would be required.

In order to mitigate the problems associated with cabling power losses, remote radio head solutions are available. Remote radio heads contain RF circuitry including amplification, filtering, RF up-conversion/RF down-conversion, analogue-to-digital conversion/digital-to-analog conversion and use a digital baseband (BB) data interface over a fixed fibre optic link to communicate to/from the baseband devices and integrated circuits (ICs) of the Node-B (base-station). Thus, with remote radio head solutions, a significant amount of processing, together with the RF circuitry is moved to the antenna mast. OBSAI RP3-01 or CPRI BB-RF serial interface standards can be used for such communications.

Node-B baseband communications to the remote radio head need to be configured and integrated with the Node-B baseband, thereby requiring significant associated engineering effort. Furthermore, OMC configuration of such devices needs to be accommodated.

Remote Radio Heads are located close to the antennas on the antenna mast/tower. These solutions are not integrated with the antenna. Thus, some losses still exist in connecting to the antenna elements via a duplexer and passive beam-former unit.

These losses associated with cabling can be reduced compared to a tower base solution. However, the losses are still typically of the order of 3 dB. Hence, for a 20 Watt (+43 dBm) effective radiated power (ERP), a 40 W (+47 dBm) RF power amplifier (PA) would be required. Nevertheless, even 40 W PAs effectively still operate at excessive and very high power levels.

However, remote radio head solutions are physically large and, by necessity due to the PA power and complexity with regard to thermal management of such PAs. High Power PAs also require mechanically large cavity duplexer devices to support the RF power handling capability.

A further problem in the use of remote radio heads results from the usual essential requirement to perform strict thermal management of high power RF PAs. The locating of remote radio heads at the top of antenna masts precludes the opportunity to use climate control systems that are typically used in tower-base buildings. Hence, the reliability of such remote radio head solutions can be compromised as a result, coupled with the limited serviceability aspects of tower-top solutions.

Modern modulation schemes used in many cellular communication systems use high peak-to-average ratios. A peak-to-average ratio of 10.5 dB is not uncommon in many versions of $3^{rd}$ generation partnership project (3GPP) wireless communication systems, such as: EDGE, wideband code division multiple access (WCDMA), WiMAX and long term evolution (LTE). Therefore, the PA needs to be operating in a linear mode when using these modulation schemes, thereby driving down the PA efficiency to sub 10%. This implies that a 100 W PA consumes in excess of 1 kW DC power.

Major efforts have been underway in recent years to improve this poor power efficiency by utilising schemes such as adaptive predistortion. Predistortion schemes utilise feedback paths where the PA output is monitored and the resultant modulation signal and the distortion detection enables an 'anti-distortion' co-efficient to be applied to the (forward path) modulation signal, thereby compensating for (off-setting) the subsequent signal distortion created by the PA. In this manner, the use of predistortion schemes allows the PA to operate in a more non-linear mode of operation, thereby increasing the PAs overall efficiency. Thus, as a result of this efficiency drive, the selection and operation of the PA is closely coupled to the operation of the modulator components.

Thus, although offering some improvement in being able to use less power RF PAs, remote radio heads have struggled to gain acceptance in the wireless communications marketplace. A primary objection to the use of remote radio heads is that their large physical size, when placed atop antenna mast assemblies, has caused a negative public reaction.

Furthermore, mast top installation of such devices, depending upon jurisdiction, is subject to regulatory health and safety enforcements limiting their weight, often to less than 26 kg.

Mast top locations are also generally at a premium for the location of antenna units; thus non-antenna installations can not be given valuable real-estate positions.

Conventional antenna arrays, comprising multiple antenna elements and used with existing Node-B equipment in most 3G installations, utilise a fixed +/−65° beam pattern. Outside of the main lobe of the antenna beam the signals are spatially filtered and significantly attenuated. Conventional network planning and passive antenna array solutions process all incoming signals with a common fixed beam pattern. Such receive processing, based on signals received within the geographic area identified by the antenna beam main lobe, tends to dictate a corresponding common beam pattern for transmitter operation. Thus, an identical radio frequency (RF) footprint is used for both receive (Rx) and transmit (Tx) operation.

Rx beam-forming using antenna arrays depends on the ability to constructively add incident signals on each of the antenna elements in a way that coherently adds those from the desired direction. Thus, incident signals that are not from the desired direction will be incoherently added, and thus will not experience the same processing gain. The term 'coherency' implies that the signals will have substantially the same phase angle.

In addition, thermal noise from multiple sources also exhibits incoherent properties, and thus when added the signals from multiple sources do not experience the same processing gain as a coherent desired signal.

Conversely in Tx active antenna arrays the signals are coherently combined within the intended beam pattern as electromagnetic (EM) signals in the 'air' so that they arrive coherently at the mobile station (MS) (e.g. UE) receiver.

In a Node-B antenna array arrangement, the received RF signal from a single UE cannot be discerned without demodulation of the composite signal. Individual receive beam-forming for a specific user is not feasible, since there is likely to be multiple received signals of the same power from different UEs simultaneously at the antenna array. Even if few UEs are utilising the Node-B, the likelihood is that the signals would be below the noise floor of the Node-B's receiver. The processing gain of a WCDMA receiver implies that the signal can be extracted from the noise floor. This, however, requires at least a partial demodulation process.

U.S. Pat. No. 5,987,037 describes an antenna array arrangement that deals with transmit-only beam generation at a tower top. The application employed in U.S. Pat. No. 5,987,037 only uses frequency division multiplexed (FDM) signals where mobile access is implemented via one channel per user. Thus, a single modulator is used and the signal is modified on each of the antenna element paths to create the beam pattern. Hence, U.S. Pat. No. 5,987,037 discloses a narrowband carrier allocation per start of call mechanism, where the narrowband carrier can be beam-formed to individual mobile communication units.

U.S. Pat. No. 6,701,137 discloses an antenna system architecture that utilises a digital back-haul link to the BB processing unit. In the architecture proposed in U.S. Pat. No. 6,701,137, beam-forming and digital signal processing are performed in the antenna tower base equipment.

Consequently, current techniques are suboptimal. Hence, an improved mechanism to address the problem of supporting antenna array technology in a wireless communication network would be advantageous.

SUMMARY OF THE INVENTION

Accordingly, the invention seeks to mitigate, alleviate or eliminate one or more of the above mentioned disadvantages singly or in any combination.

According to a first aspect of the invention, there is provided a network element for a wireless communication system locatable to couple at least one base station to an antenna array. The network element comprises at least one receiver arranged to receive a radio frequency signal from the at least one base station or the antenna array; radio frequency conversion circuitry arranged to down-convert a received radio frequency signal to a baseband signal; analogue-to-digital conversion logic arranged to convert the baseband signal to digitized signals; beam-form processing logic arranged to perform active beam-forming adjustment on the digitized signals; digital-to-analogue conversion logic arranged to convert the beam-form adjusted digitized signals to analogue signals; and radio frequency conversion circuitry arranged to up-convert the analogue signals to a radio frequency radio signal for forwarding to the at least one base station or antenna array. The network element further comprises a wireless modem operably coupled to the beam-form processing logic and arranged to receive and process at least one wireless command and in response thereto perform beam-forming adjustment on the digitized signals.

In doing so, one embodiment of the invention avoids the need to process a plurality of antenna array processing feeds to the base station corresponding to each antenna radiative element.

The invention may allow improved use of the communication resource in the communication system, for example by allowing adjustment of beam-forming of radio signals that are used to communicate with UEs/mobile stations. Embodiments of the invention may also allow an active beam-form capable antenna array communicate with a standard base station, without modification of the RF components or software for controlling such. Embodiments of the invention may also allow for low cost RF feed cable, with losses that may be deemed unacceptable in a conventional base station, to connect antenna apparatus with base station.

Embodiments of the invention may further allow a removal of coaxial cable feed to the antenna array by supporting a wireless link.

Embodiments of the invention may also allow an active beam-form capable antenna array communicate without need of modification of operator domain network software or hardware components. Control commands may be sent via internet protocol (IP) communication, transported over the supported base station air-interface protocol, where the control may be supported by a computing device also connected via IP.

Embodiments of the invention may also allow an active beam-form capable antenna array communicate without need of modifying base station software. Control commands may be sent via IP, transported over the supported base station air-interface protocol, where the control may be supported by the OMC that may also be connected via IP.

Embodiments of the invention may also allow an active beam-form capable antenna array communicate without use of a base station duplexer. In this embodiment, separate receive and transmit coaxial cables may be used to communicate via the antenna array.

The invention may allow improved performance as perceived by the end-users, for example by allowing beam formation of the radiative antenna elements to be directed to user populations or to regions to provide in-fill cellular coverage. Embodiments of the invention may provide increased throughput rates, for example, due to optimised beam formations in both uplink and downlink.

According to an optional feature of the invention, the radio frequency conversion circuitry may further comprise multiple independent transmitter or receiver circuits coupled to respective antenna elements of the antenna array. In this manner, more agile control of beam form functions may be achieved.

Furthermore, in transmit mode, the amplification process may be distributed amongst a number of amplifying devices, thereby spreading the power handling requirement of the RF signals. This may significantly relax such amplifier and duplexer component specifications in terms of thermal heat dissipation of magnitude of RF voltage handling ability. Furthermore, from a mean time to failure perspective, distributing the signal processing may ensure that even if a single failure exists, the functionality of the unit may not be significantly impaired.

According to an optional feature of the invention, the wireless modem comprises control logic arranged to support a plurality of radio frequency channels corresponding to a plurality of different beam patterns. In this manner, the Node B/base station may process multiple uplink beam formations. In this manner, convolved beam patterns may be processed by the baseband, thereby allowing baseband processing to exploit the spatial filtering of certain sub sectors beams, and thus improving the signal to interference of such users whose signal is concentrated from within these beam formation sub sectors.

According to an optional feature of the invention, the wireless modem is arranged to independently process polarisation diversity receive signals. In this manner, diverse signals as received in the radiating elements of the antenna may be independently processed by the Node B/base station baseband unit. Signals incident on the antenna array of a fixed polarisation may be processed independently, for example to extract the coherent properties of the incident signal. Cross polarisation antennas may also be used to extract polar diverse signals from the air interface; due to the fact that for signals that are diverse, coherent properties are unlikely to exist.

According to an optional feature of the invention, the network element is adapted to receive multiple transmissions from multiple base stations where the multiple transmissions are wirelessly combined at different carrier frequencies. In this manner, multiple base stations may share common antenna array equipment, thus limiting infrastructure equipment requirements.

According to an optional feature of the invention, the wireless modem comprises logic for communicating with at least one other network element in a wireless communication infrastructure using an air interface protocol. In this manner, control of such a network element may be optimised with a goal of potentially improving coverage and capacity of such a device.

According to an optional feature of the invention, the wireless modem comprises logic for providing feedback via at least one base station of the effects of beam-forming. In this manner, information pertaining to sector dispersion of angle of arrival of incoming received signals may be relayed so that further optimisation of the network may take effect.

According to an optional feature of the invention, the network element is located at a top of an antenna mast. In this manner, a network elevated radiated element may allow for optimum propagation of RF signals over a geographic area, by being substantially devoid of obstructive physical structures at a top of mast location.

According to an optional feature of the invention, the signal provided to at least one base station may comprise a diversity signal. In this manner, diverse signals as received in the radiating elements of the antenna can be independently processed by the Node B/base station baseband unit.

According to an optional feature of the invention, the logic for providing feedback to the at least one base station comprises logic for determining at least one from a group of: failure detection, angle of arrival of a received wireless signals, operating temperature of a device contained in the network element. In this manner, compensating beam formations may be decided upon, or maintenance may be scheduled.

According to an optional feature of the invention, the network element is arranged to support separate radio frequency channels to be used in parallel to live traffic channels to relay antenna array beam-forming information to the wireless modem. In this manner, the aspects to do with isolation between the input and output of the antenna array may be minimised in terms of impact to radio performance.

According to an optional feature of the invention, the wireless modem comprises control elements arranged to effect beam-form profiles to be deployed on transmit and/or receive antenna radiating element of the antenna array. In one optional embodiment, the control elements may comprise elements to effect adjustment of at least one from a group of: pan and tilt, for the antenna array. In this manner, simple beam adjustments may be made akin to alterations of a conventional passive antenna system. This may simplify control aspect functionality.

According to an optional feature of the invention, the network element may comprise signal conversion gain elements located on respective radio frequency paths to ensure that signals transmitted to at least one base station are maintained within a correct dynamic range. In this manner, the receive path of the respective base station may not experience saturation, thus impairing its signal processing capability. Conversely, signals need to be maintained within the lower bounds of the dynamic range of the receiver so that the receiver noise performance may be met.

According to an optional feature of the invention, the network element comprises a separate transmit and receive communication link to the at least one base station. In this manner, the use of expensive duplexer components may be eliminated from the base station and in the antenna array feedback path.

According to an optional feature of the invention, the network element may comprise a wireless communication link to the at least one base station. In this manner, the use of feeder cables may be eliminated. Furthermore, cable trunking to an antenna location may not always be feasible, thus a wireless link may allow support such an antenna placement.

According to an optional feature of the invention, the network element may comprise a low-power power amplifier arranged to transmit low power wireless signals to the at least one base station on the wireless communication link. In this manner, by virtue of being low-power, and by virtue of use of a directional antenna beam, isolation of the feedback beam may be achieved, such that it does not interfere with the uplink path to the antenna array.

According to a second aspect of the invention, there is provided a method for antenna array beam-forming by a network element located between an antenna array and at least one base station in a wireless communication system and comprising a wireless modem. The method comprises receiving a radio frequency signal from the at least one base station or the antenna array; performing radio frequency conversion to down-convert a received radio frequency signal to a baseband signal; and performing analogue-to-digital conversion to convert the baseband signal to digitized signals. The method further comprises receiving and processing at least one command received wirelessly by the wireless modem; performing, in response to the at least one wireless command, active beam-forming adjustment on the digitized signals; performing digital-to-analogue conversion to convert the beam-form adjusted digitized signals to analogue signals; and up-converting the analogue signals to a radio frequency radio signal for forwarding to the antenna array or the at least one base station.

According to a third aspect of the invention, there is provided a communication system that comprises a network element locatable to couple at least one base station to an antenna array. The network element comprises at least one receiver arranged to receive a radio frequency signal from the at least one base station or the antenna array; radio frequency conversion circuitry arranged to down-convert a received radio frequency signal to a baseband signal; analogue-to-digital conversion logic arranged to convert the baseband signal to digitized signals; and beam-form processing logic arranged to perform active beam-forming adjustment on the digitized signals. The network element further comprises digital-to-analogue conversion logic arranged to convert the beam-form adjusted digitized signals to analogue signals; and radio frequency conversion circuitry arranged to up-convert the analogue signals to a radio frequency radio signal for forwarding to the antenna array or the at least one base station. The network element further comprises a wireless modem operably coupled to the beam-form processing logic and arranged to receive and process at least one wireless command and in response thereto perform active beam-forming adjustment on the digitized signals.

According to a fourth aspect of the invention, there is provided a computer program product comprising program code for antenna array beam-forming by a network element located between an antenna array and at least one base station in a wireless communication system and comprising a wireless modem. The computer program product comprises program code operable for: receiving a radio frequency signal from the at least one base station or the antenna array; performing radio frequency conversion to down-convert a received radio frequency signal to a baseband signal; and performing analogue-to-digital conversion to convert the baseband signal to digitized signals. The program code is also operable for: receiving and processing at least one wireless command by the wireless modem; performing, in response to the at least one wireless command, active beam-forming adjustment on the digitized signals; performing digital-to-analogue conversion to convert the beam-form adjusted digitized signals to analogue signals; and up-converting the analogue signals to a radio frequency radio signal for forwarding to the antenna array or the at least one base station.

These and other aspects, features and advantages of the invention will be apparent from, and elucidated with reference to, the embodiments described hereinafter.

Figure 1:
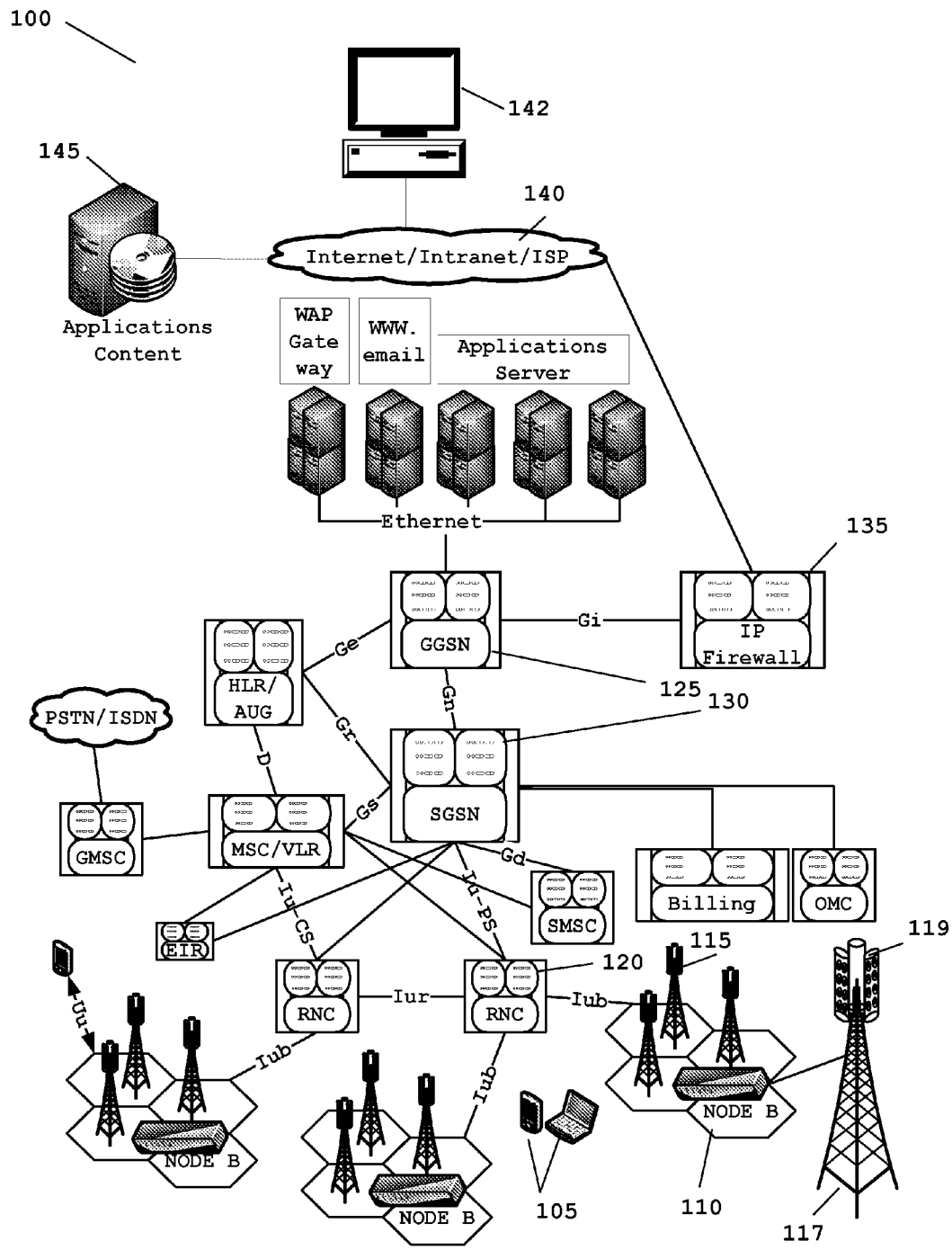
FIG. 1 illustrates a known 3GPP cellular communication system architecture.
Figure 2:
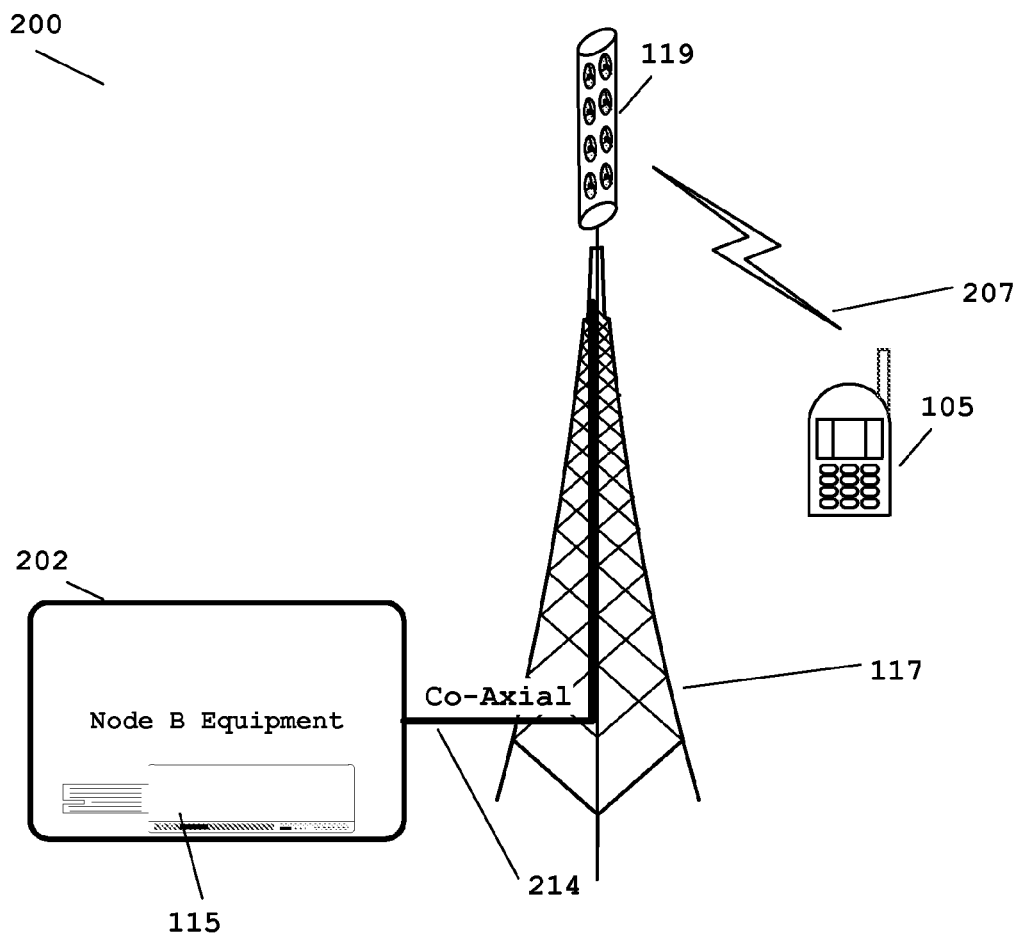
FIG. 2 illustrates a known Node-B antenna array arrangement.
Figure 3:
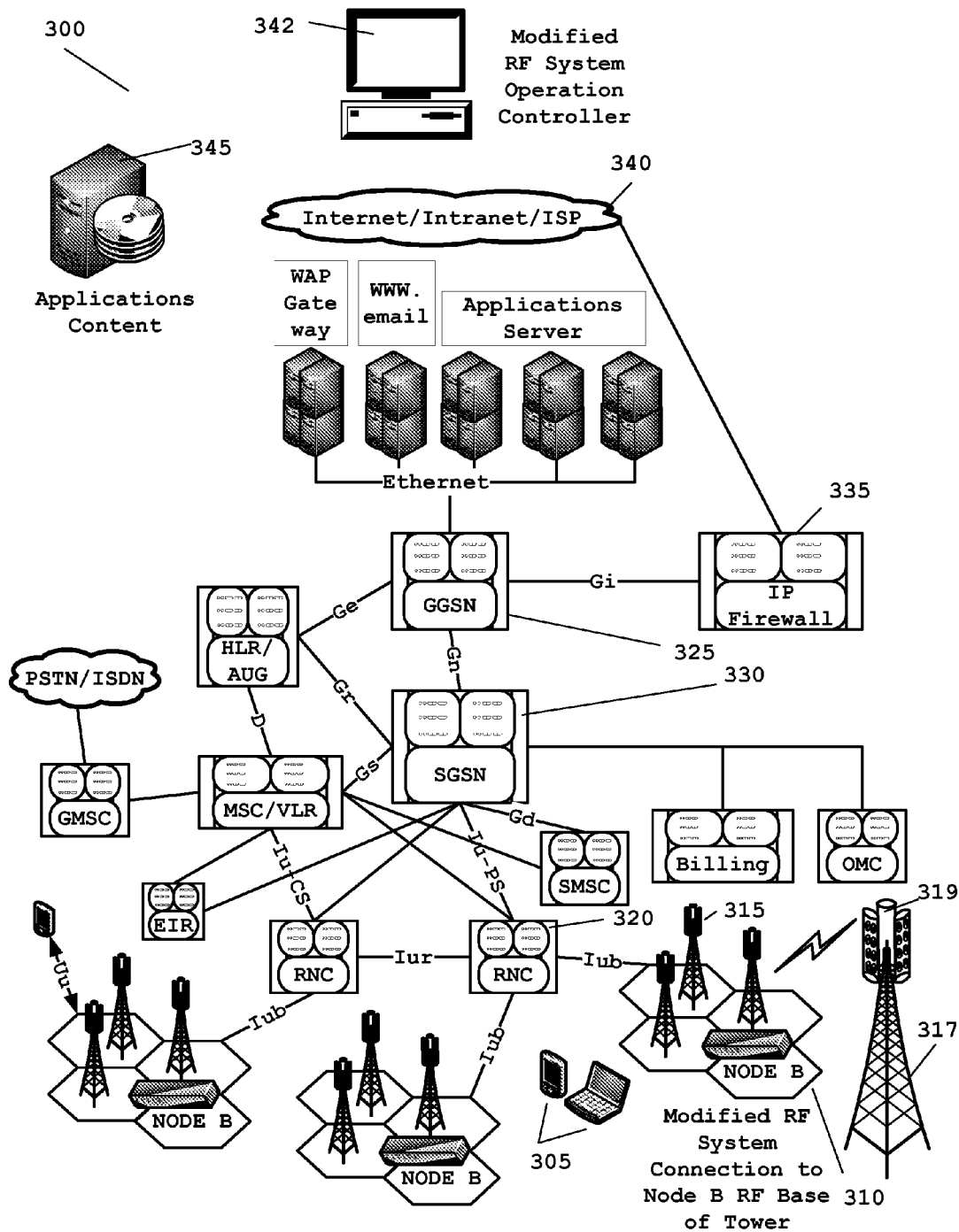

Embodiments of the invention will be described, by way of example only, with reference to the accompanying drawings, in which:

FIG. 3 illustrates an example of a 3GPP cellular communication system adapted in accordance with some embodiments of the invention.

Figure 4:
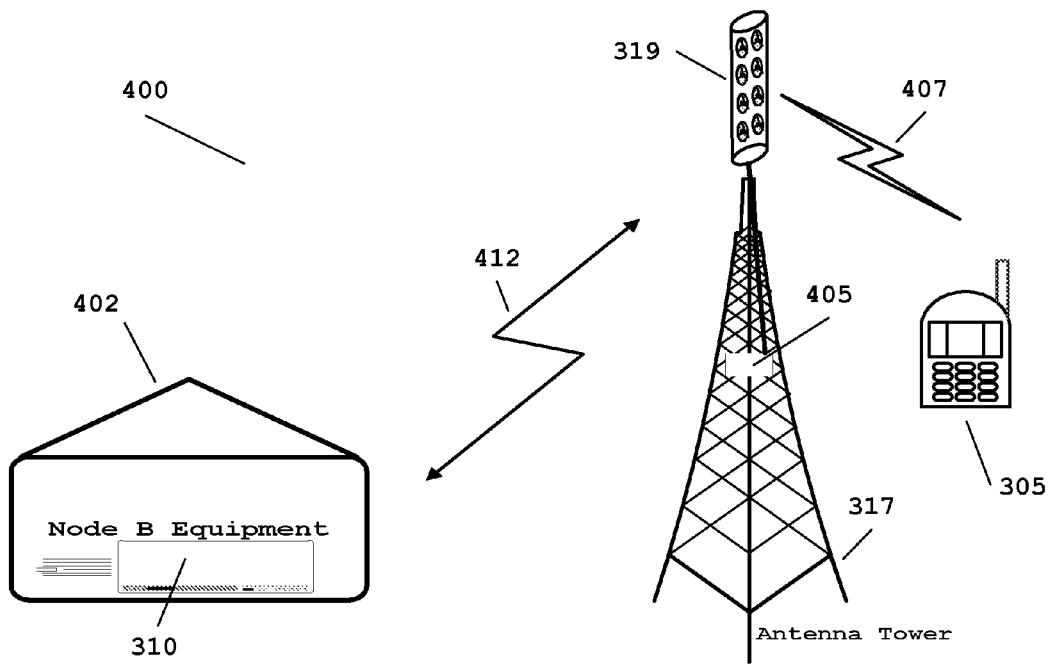
Figure 4:
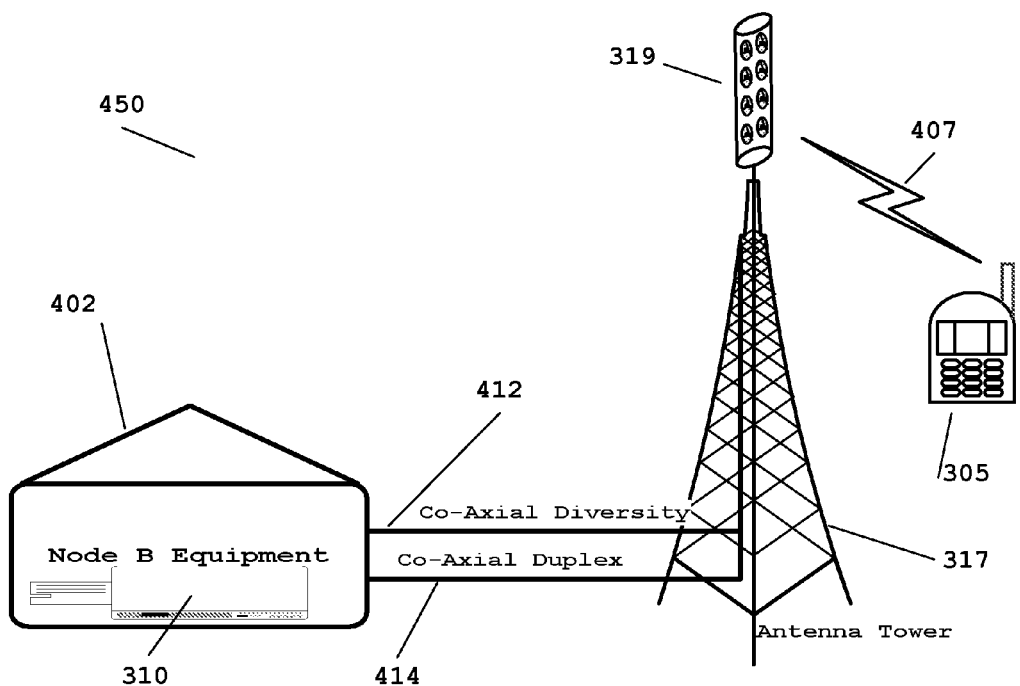

FIG. 4 illustrates an example of a Node-B antenna array arrangement adapted in accordance with some embodiments of the invention.

Figure 5:
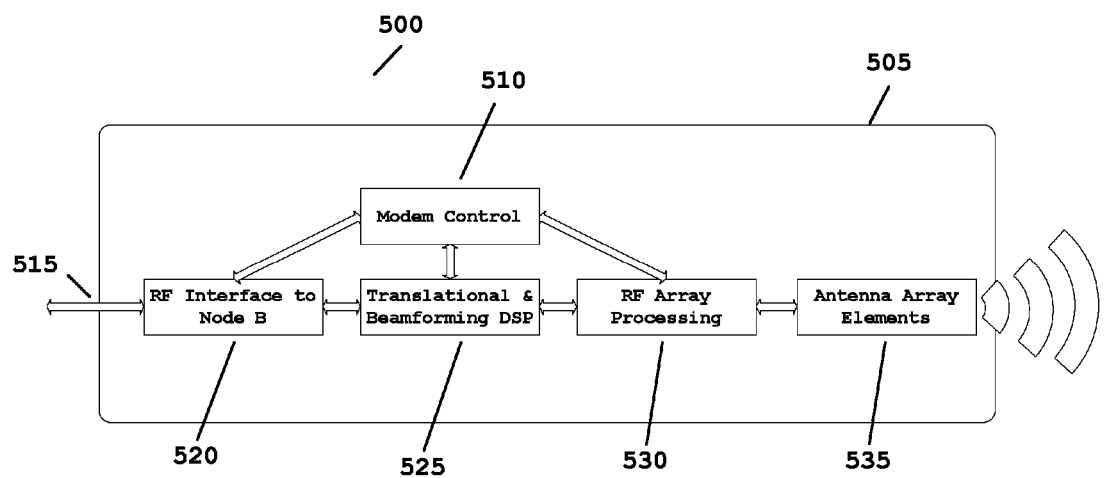

FIG. 5 illustrates an example of a network element arranged to perform beam-forming at the antenna mast in accordance with some embodiments of the invention.

Figure 6:
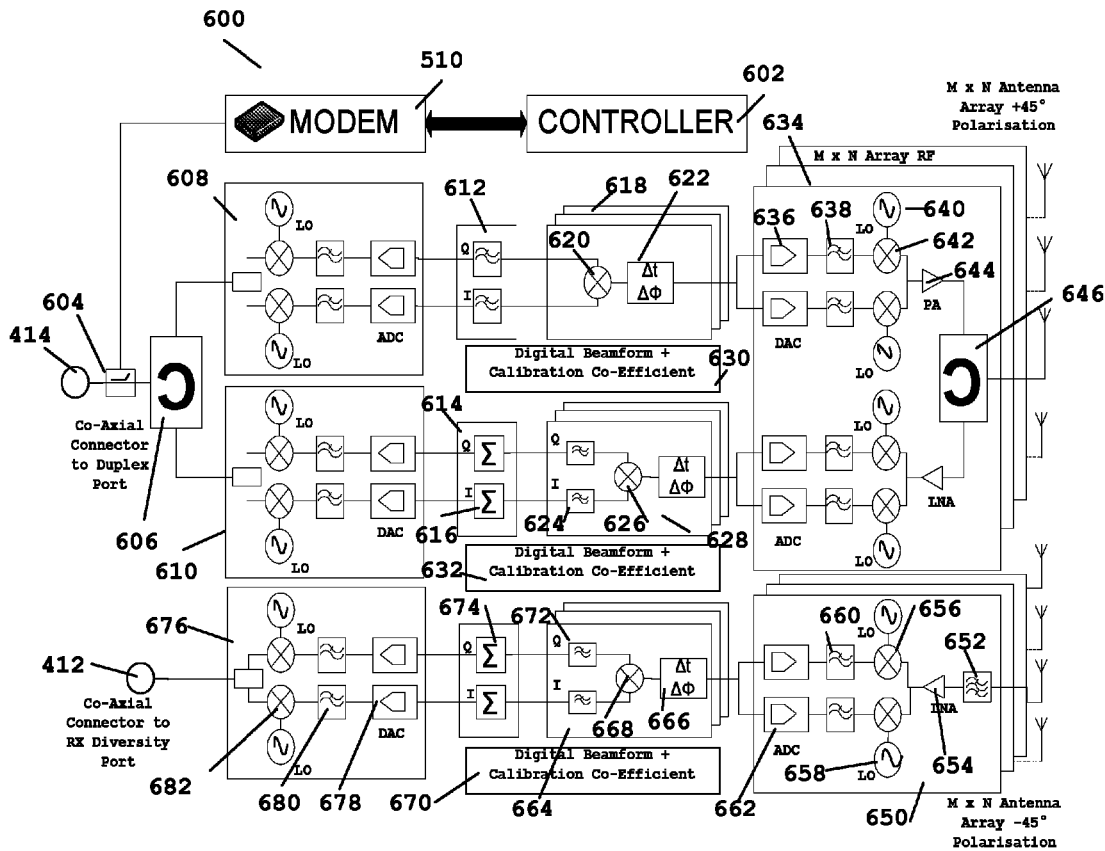

FIG. 6 illustrates a more detailed example of a network element embodiment of FIG. 5.

Figure 7:
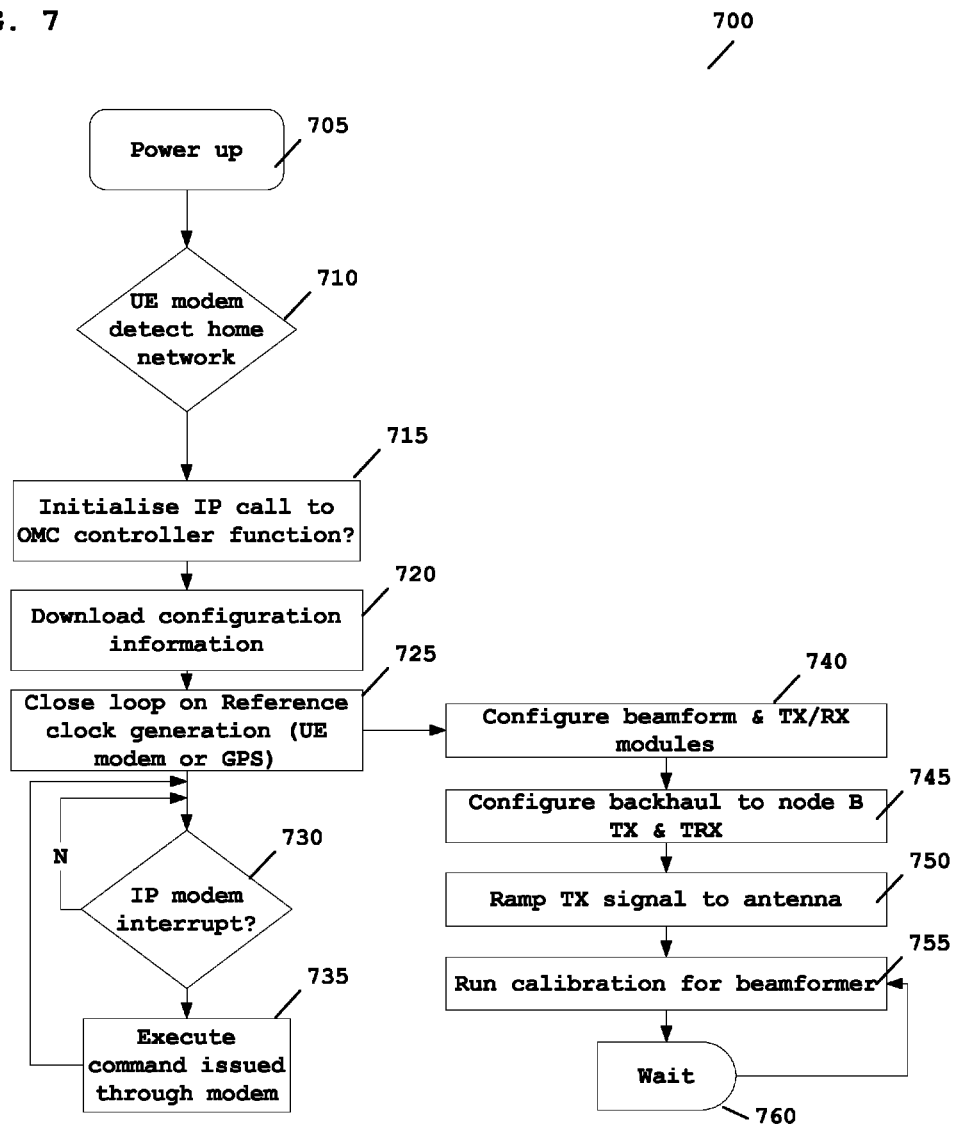

FIG. 7 illustrates an example of a method of performing beam-forming of an antenna array in a wireless communication system adapted in accordance with some embodiments of the invention.

Figure 8:
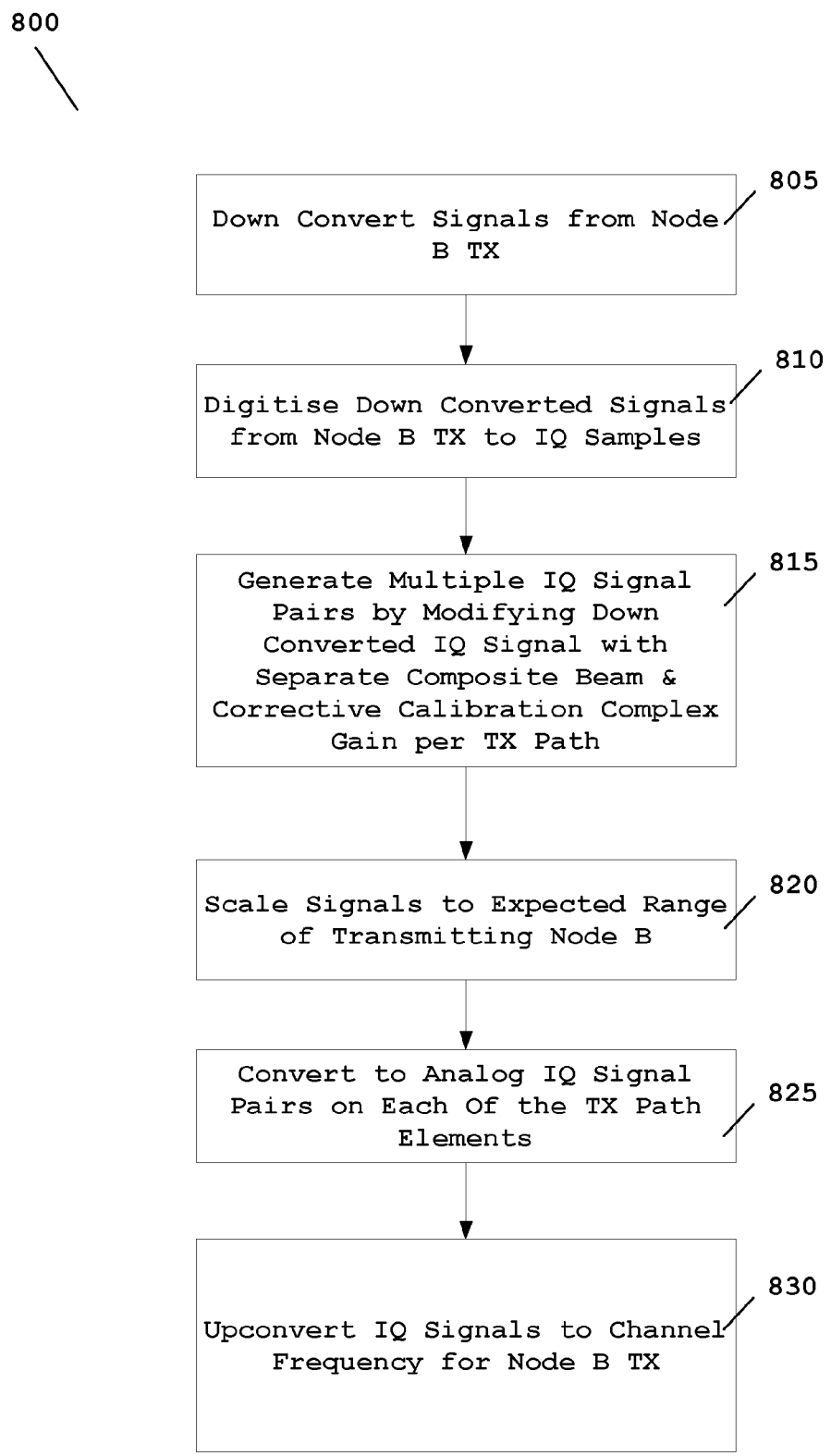

FIG. 8 illustrates an example of a Node-B transmit signal processing flow method for performing beam-forming of an antenna array in a wireless communication system adapted in accordance with some embodiments of the invention.

Figure 9:
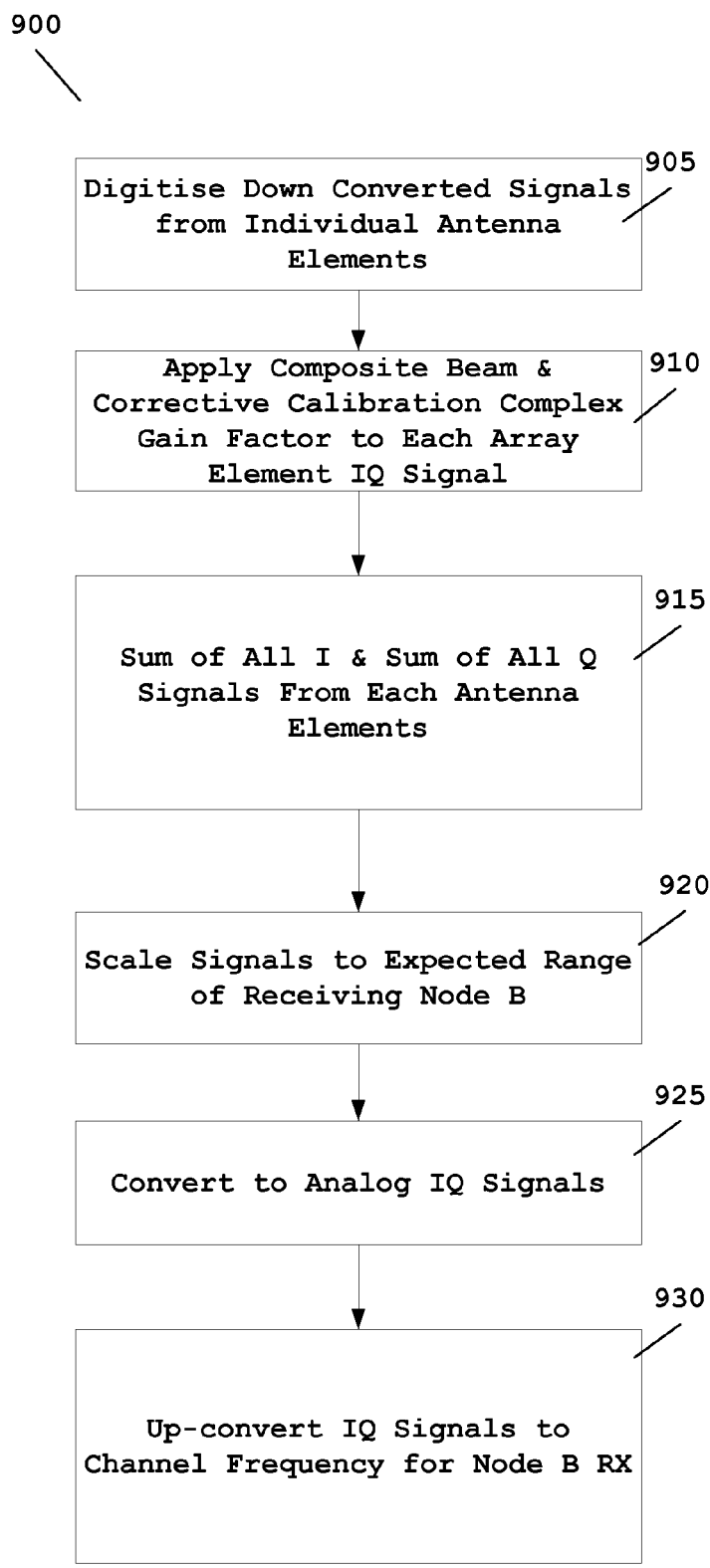

FIG. 9 illustrates an example of a Node-B receive signal processing flow method for performing beam-forming of an antenna array in a wireless communication system adapted in accordance with some embodiments of the invention.

Figure 10:
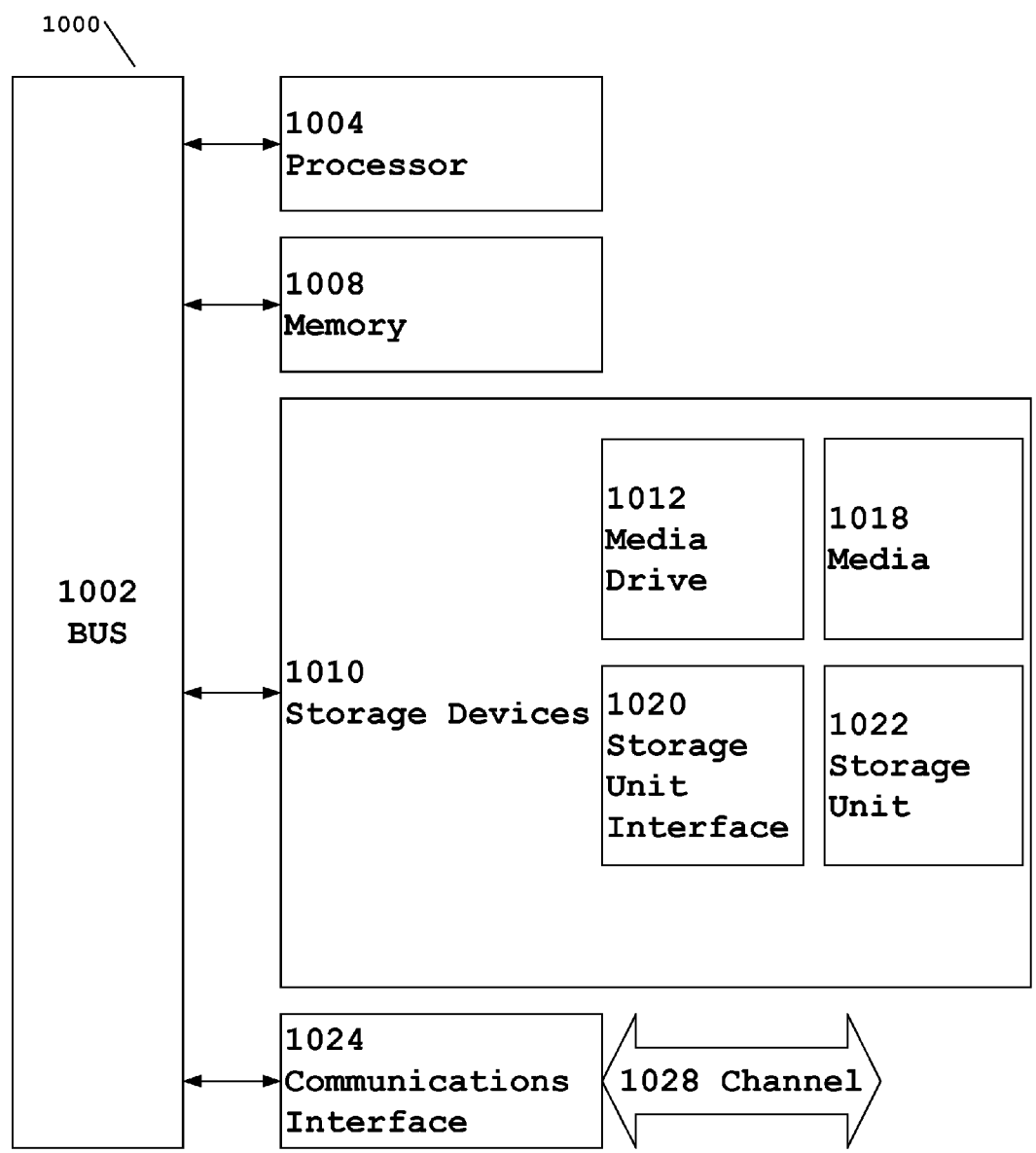

FIG. 10 illustrates a typical computing system that may be employed to implement signal processing functionality in embodiments of the invention.

DETAILED DESCRIPTION OF EMBODIMENTS OF THE INVENTION

In the field of radio-array active antenna technology, receive signals are additively combined coherently from the different receiver (Rx) elements. This receive combining operation may be implemented in the digital domain. For optimal coherency to exist on the separate signals at the combining stage, the latency, phase response and gain response of the respective receive paths should be equalised. Different receivers in an array may exhibit variations in these characteristics due to, say, component manufacturing tolerances, clock skew, temperature and power supply variations, etc. For example, in practical systems, there will be different instantiations of voltage regulators, and therefore different devices may exhibit process-induced offsets and temperature-dependent coefficients. Similarly, the clock distribution to multiple transceivers undergoes variations in the clock path, thereby causing an offset in relative phase to each transceiver. It is also known that temperature profiles within the antenna array housing may be significant.

Furthermore, each of the transceivers will not have the same proximity to heat generating components, such as the digital signal processing chain. Likewise certain transceivers will be at a periphery of the array, and therefore experience more variation due to the ambient environment. In addition, some transceivers will have different transmit power profiles, according to the beam-form coefficients, and as a result exhibit different thermal generation profiles.

There are significant problems with upgrading network infrastructure, particularly Node-Bs, as an upgrade invariably causes a ripple effect to other infrastructure components. Generally any RF subsystem, such as one located in a Node-B, can not be replaced in isolation. All components in the network that are associated with controlling and interfacing to the replaced Node-B (or components of the Node-B) would need to be reconfigured or upgraded accordingly. Furthermore, the OMC is system critical to the network and thus any changes affecting the OMC's operation, such as replacing a Node-B, would have to be exhaustively tested before deployment.

Embodiments of the invention herein described propose a solution that alleviates or negates some of the aforementioned problems and allows a retro-fit solution to existing network infrastructure.

In one embodiment of the invention, the air interface protocol may be used in issuing configuration commands to an antenna mast located modulator/demodulator (modem), via a Node-B. In one embodiment of the invention, the air interface protocol may be used by a Node-B to solicit feedback information on any parameters monitored by the antenna mast located network element which may be in a form of a modem. For example, such additional feedback information may allow an antenna system to apply spatial reasoning to the beam-forming adjustment operation.

Furthermore, the modem can be issued commands wirelessly to configure and control many aspects of the network element as well as those explicitly for beamform control. These include for example, the frequency or frequencies of operation of the network element, analogue to digital convertor modes of operation, air interface protocol being processed, output power settings from the power amplifier.

In accordance with embodiments of the invention, the OMC may be adapted to send control information to the antenna mast located network element, e.g. modem, relating to beam-form profiles to be deployed on transmit and receive operation of the antenna or antenna array. Thus, in one embodiment of the invention, the OMC may instruct the antenna mast located network element, via the Node-B, to perform operations such as pan and tilt for the antenna system, and/or effect signal conversion gain variations on respective RF paths, thereby enabling the dynamic range of the Node-B to operate within its correct dynamic range.

Improved network performance, including reduced power consumption, and improved RF link performance can be achieved with provision of more signal processing at the tower top antenna array. In particular, allowing a retrofit solution as proposed herein will further improve such performance if the low noise amplifier and RF power amplifier are performed remotely and immediately adjacent the antenna elements (or antenna arrays), as opposed to being located at the Node-B in the vicinity of the antenna mast base.

In embodiments of the invention, picocell type RF sub-assemblies may be utilised in lower RF power base station equipment, notably using an RF link to the antenna mast.

Embodiments of the invention are described with reference to smart (or active) antenna technology used in a wireless communication system. Smart (or active) antenna technology is a radio technology where the antenna system comprises dedicated signal processing logic per antenna array element. Alternative embodiments may be employed in co-located antenna and signal processing units. Smart (active) antenna technologies fall into three broad families, namely: (i) multi-antenna systems (MAS); (ii) radiohead implementations with or without multiple in-multiple out (MIMO) radio ports; and (iii) active antenna arrays.

The following description focuses on embodiments of the invention that are applicable to active antenna arrays employed in Universal Mobile Telecommunication System (UMTS) cellular communication systems and in particular to a UMTS Terrestrial Radio Access Network (UTRAN) operating in a $3^{rd}$ generation partnership project (3GPP) system. However, it will be appreciated that the invention is not limited to this particular cellular communication system, but may be applied to any wireless communication system employing active antenna arrays where the antenna may be integrated with antenna beam-forming conversion apparatus or circuits.

Referring now to FIG. 3, a cellular-based communication system 300 is shown in outline, in accordance with one embodiment of the invention. In this embodiment, the cellular-based communication system 300 is compliant with, and contains network elements capable of operating over, an universal mobile telecommunication system (UMTS) air-interface.

A plurality of wireless subscriber communication units/terminals (or user equipment (UE) in UMTS nomenclature) 305 communicate over radio links with a plurality of base transceiver stations, referred to under UMTS terminology as Node-Bs, 315 supporting communication coverage over a particular communication cell 310. The system 300 comprises many other UEs and Node-Bs, which for clarity purposes are not shown.

The wireless communication system, sometimes referred to as a Network Operator's Network Domain, is connected to an external network 340, for example the Internet. The Network Operator's Network Domain includes:

(i) A core network, namely at least one Gateway General Packet Radio System (GPRS) Support Node (GGSN) 325 and at least one Serving GPRS Support Nodes (SGSN) 330; and (ii) An access network, comprising a UMTS Radio network controller (RNC) 320; and at least one UMTS Node-B 315, where each RNC 320 may control one or more Node-Bs 315.

The GGSN 325 or SGSN 330 is responsible for UMTS interfacing with a Public network, for example a Public Switched Data Network (PSDN) (such as the Internet) 340 or a Public Switched Telephone Network (PSTN). The SGSN 330 performs a routing and tunnelling function for traffic, whilst a GGSN 325 links to external packet networks. Each SGSN 330 provides a gateway to the external network 340. The Operations and Management Centre (OMC) is operably connected to RNCs 320 and Node-Bs 315. The OMC comprises processing functions and logic functionality in order to administer and manage sections of the cellular communication system 300, as is understood by those skilled in the art.

The Node-Bs 315 are connected to external networks, through Radio Network Controller (RNC) stations, including RNC 320 and mobile switching centres (MSCs), such as SGSN 330. A cellular communication system will typically have a large number of such infrastructure elements where, for clarity purposes, only a limited number are shown in FIG. 3.

Each Node-B 315 contains one or more transceiver units and communicates with the rest of the cell-based system infrastructure via an $I_{ub}$ interface, as defined in the UMTS specification. Each Node-B 315 is operably coupled to an antenna mast 317 for transmitting and receiving signals to/from remote UEs, where each antenna mast 317 comprises an antenna array 319 adapted in accordance with embodiments of the invention.

In accordance with embodiments of the invention, active array technology is employed in the cellular communication system 300.

Referring now to FIG. 4, examples of Node-B-antenna array arrangements 400, 450, as adapted in accordance with some embodiments of the invention, are illustrated. A first example 400 comprises a Node-B enclosure 402 housing a Node-B 310. The Node-B enclosure 402 is located adjacent an antenna mast 317 that comprises an antenna array 319 located substantially near or at the top of the antenna mast 317. The antenna array wirelessly communicates 407 with one or more wireless communication units, such as UEs 305. In this example, a wireless RF communication link is provided from a Node-B to an antenna mast located network element, such as modem 405. The antenna mast located modem 405 is further described with reference to FIG. 5 and FIG. 6.

In one embodiment of the invention, the aforementioned example 400 may be implemented using a relatively low-power power amplifier (PA) in the Node-B 310, such that a pico-cell type low-power wireless communication link is arranged between the Node-B and the antenna circuitry. This is in contrast to the known technique of using fixed cabling in a form of co-axial cables or a fibre-optic link. In this manner, and advantageously signals from a number of different PAs may be summed coherently in the 'air'. Thus, a 20 Watt effective radiated power (ERP) with a ten transmitter array solution, assuming that all transmitter array elements are of equal power could be achieved only with each transmitter outputting 33 dBm or 2 Watts. Advantageously, this level of output power is within a mobile handset PA's capability. Therefore, the power consumption in the PA is considerably less than the traditional Node-B 47 dBm approach. Even at 10% efficiency per PA, the overall PA power consumption is 250 Watt, as compared to 1 kWatt used in a conventional solution.

Furthermore, given that the RF signal processing employed in the antenna mast located network element, e.g. modem 405, is no more problematic than for a mobile handset, RF thermal management and the required form factor of the RF signal processing logic ensures that the proposed may solution readily fit within the same enclosure as the conventional antenna structure.

In this first example, it is noted that the provision of a wireless RF link between a Node-B and an antenna or antenna array provides advantages and solves problems outside of the general concept herein described of smart (or active) antenna technology, where an antenna array system comprises dedicated digital signal processing logic, substantially per antenna array element with RF down-conversion and RF up-conversion circuitry to facilitate digital beam-forming and/or coefficient calibration.

In this first example, outside of being employed in smart antenna technology, the wireless RF link solves a general problem of Node-Bs requiring excessively high power PAs to compensate for the subsequent losses due to cabling between known Node-Bs and the antenna or antenna array located substantially atop of an antenna mast. For example, typical Node-Bs require RF PA's of up to 40 W (+47 dBm) RMS output power in order to achieve an effective radiated power of 20 W (+43 dBm). Since, in this first example, the Node-B only needs to be able to transmit to the top of the antenna mast, e.g. a likely distance of tens of meters, a PA of, say, −10 dBm will be more than adequate to complete the transmission to the antenna or antenna array. Thus, power consumption in the Node-B may be significantly reduced. Furthermore, the cost of, and thermal consideration for, components used in the Node-B are also significantly reduced.

Advantageously, the final PA device may be located at the top of the antenna mast, adjacent the antenna or antenna array, thereby significantly reducing the cabling and coupling losses between the PA and antenna.

In this regard, in the first example, a base station may be located remote from an antenna mast and an associated antenna or antenna array, which may be located substantially at a top of the antenna mast. The base station may comprise a low power transmitter for wirelessly transmitting signals to the associated antenna or antenna array. The antenna array comprises of RF circuitry arranged, in effect, to operate in the manner of a repeater, namely to receive and convert a wirelessly transmitted low power signal from the base station and amplify this signal through an amplifier chain to a high power radio frequency signal to be radiated from the antenna.

In this first example, in a base station receive mode of operation, received signals at the antenna or antenna array may be re-transmitted to the base station using either a significantly attenuated path attached from a high power PA or using a low-power PA arranged to wirelessly transmit low power signals to the base station. In this manner, signals received at the base station are maintained within an acceptable dynamic range.

A second example 450 again comprises a Node-B enclosure 402 housing a Node-B 310. The Node-B enclosure 402 is again located adjacent to an antenna mast 317 that comprises an antenna array 319 located substantially near or at the top of the antenna mast 317. The antenna array wirelessly communicates 407 with one or more wireless communication units, such as UEs 305. In this example, a pair of co-axial cables 414 is provided from the Node-B 315 to an antenna mast located network element, e.g. modem 405. The pair of co-axial cables 414 is arranged to respectively support independent transmit and receive communications between the Node-B and the antenna mast located modem 405. The antenna mast located modem 405 is further described with reference to FIG. 5 and FIG. 6, as mentioned.

A third example again comprises a Node-B enclosure 402 housing a Node-B 310. The Node-B enclosure 402 is again located adjacent to an antenna mast 317 that comprises an antenna array 319 located substantially near or at the top of the antenna mast 317. The antenna array communicates 407 with one or more wireless communication units, such as UEs 305. In this example, a pair of co-axial cables 414 is provided from the Node-B 315 to an antenna mast located network element, e.g. modem 405. The pair of co-axial cables 414 is arranged to respectively support a duplex path of receive and transmit and a diversity receive communications path between the Node-B and the antenna mast located modem 405. The antenna mast located modem 405 is further described with reference to FIG. 5 and FIG. 6, as mentioned.

In one embodiment of the invention, the pair of co-axial cables 414 may be supplemented by an additional co-axial cable 412 arranged to support co-axial receive diversity signals being passed between the antenna mast 405 and the Node-B.

In this embodiment, the Node-B transmit signals and receive signals are split and processing is confined to respective processing chains.

In both examples of FIG. 4, the antenna mast located modem 405 may be configured to provide local beam-forming of signals transmitted from or received by an adjacent antenna array.

Generally, in current commercially-deployed Node-B equipment, no beam-forming is performed in the Node-B (including any Node-B associated equipment located at a base of an antenna mast) as there is just a single RF feed per antenna array to the top of the antenna mast. The only beam-forming that may be implemented is the fixed beam-forming structures of power splitter phase shifters that some Network Operators utilise prior to, or located in, the antenna array device. Further, some electromechanical options are available in order to provide pan and tilt operations on the antenna array systems themselves, when controlled from the Node-B via optical fibre baseband communications.

In contrast to the known beam-forming techniques, and referring now to FIG. 5, an example of an antenna mast located network element e.g. modem 405, arranged to exercise control of beam-forming functions at the antenna mast is illustrated in accordance with some embodiments of the invention. The RF communication link 515 is coupled into an RF interface to Node-B module 520. The operation of the RF interface to Node-B module 520 is under control of modem control logic 510.

The wireless modem comprising modem control logic 510 further comprises a number of circuits (not shown) configured to receive and process one or more commands, for example received wirelessly and sent over the live network air-interface traffic. For example, in one embodiment, the wireless modem also comprises one or more radio frequency down-conversion components or circuits, one or more analogue-to-digital converters and appropriate signal processing to interpret and react to any commands received. Following processing of the commands, the modem control logic 510 is able to provide digital control signals to be applied to any number of the network element components or circuits, including but not limited to beam-form processing logic. Similarly, in one example embodiment, the modem control logic 510 may further comprise a number of further circuits (not shown), for example signal processing to interpret and react to any information received from any number of the network element components or circuits, including but not limited to beam-form processing logic, and route these signals via, say radio frequency up-conversion circuits for wireless transmitting to other network elements.

The RF interface to Node-B module 520 is arranged to down-convert the received RF signal to baseband analogue signals, that are digitised by an analogue-to-digital converter to form digital signals for subsequent manipulation.

The RF interface to Node-B module 520 then outputs baseband signals in a form of IQ data sample pairs to at least one translational and beam-forming digital signal processor (DSP) 525, which is arranged to perform filtering of the IQ data signals and application of beam-form weights on the filtered IQ data signals for each of the individual transceiver elements. In one example embodiment, beam-form weights may comprise of one or more of: relative phase, amplitude and latency relationship between each of the antenna elements.

The at least one translational and beam-forming digital signal processor (DSP) 525 may also be arranged to calculate co-efficient calibration parameters to be applied to down-converted baseband signals. Such calibration parameters may be arranged to correct for any impairments in the individual transmit or receive chains. The operation of the at least one translational and beam-forming digital signal processor (DSP) 525 is also under control of modem control logic 510 and facilitates the plurality of IQ sample pairs being used in separate transmit chains in order to implement a beam-form antenna. Once the transmit signals have been processed and modified according to the beam-forming that has been applied, the beam-form manipulated baseband signals are provided to RF Array processing circuits 530.

RF array processing in transmit mode consists of an array of elements; each one consisting of digital to analogue conversion to generate complex baseband analogue signals. These signals are filtered and frequency translated to the desired RF band. These signals are amplified and routed through a duplexer device to isolate transmit signals from the receive paths and operably coupled to the antenna elements.

RF array processing in receive mode consists of an array of elements; each one consisting of a duplexer device to isolate transmit signals from the receiver, a low noise amplifier, a down-conversion frequency translator, a low pass filter and analogue to digital conversion.

The operation of the RF Array processing circuits 530 is also under control of modem control logic 510. The RF Array processing circuits 530 are arranged to up-convert transmit signals to RF and route the RF signals through a high power transmit chain, including a high power PA. Advantageously, as the RF Array processing circuits 530 are located adjacent the antenna array, there is significantly less loss associated with linking the final PA to the antenna array (as there is minimal use of lossy cables). Thus, prior to radiating the transmit signal from the antenna array, significantly less power PAs may be used compared to known Node-B PAs.

Furthermore, the use of a passive beam-former device, as used in a conventional antenna array, is no longer required. Conventional antenna arrays are devices having power splitters and different phase shifter elements coupled to each of the antenna array radiating elements. Employing embodiments of the invention may eliminate or alleviate the ensuing loss associated with using a passive beam former. Since each of the radiating elements is connected directly to the transceiver device, the RF power delivered by each device is scaled by the antenna array.

In accordance with embodiments of the invention the RF Array processing circuits 530 are coupled to an antenna array 535, such that each of the independent antenna elements of the antenna array is fed, in parallel, by an independent transceiver/receiver device.

In a receive mode of operation, each antenna element has its own receive signal chain. The RF Array processing circuits 530 are arranged to provide low noise amplification, RF filtering, down conversion and baseband filtering of the received signals from the independent transceiver elements. The analogue baseband signal is then digitised. Thus, the outputs of the RF Array processing circuits 530 are baseband signals in a form of IQ data sample pairs.

The output from the RF Array processing circuits 530 is provided to the at least one translational and beam-forming digital signal processor (DSP) 525 that is again arranged to perform beam-forming and apply co-efficient calibration on the down-converted baseband signals. The operation of the at least one translational and beam-forming digital signal processor (DSP) 525 allows for the generation of a plurality of IQ sample pairs used in separate receive chains to effectively represent a multiple receiver chain of a beam-form antenna array. In this manner, IQ signals are combined in the digital domain from a plurality of receive chains. These IQ sample pairs may be combined optimally.

Once the receive signals have been processed and modified according to the beam-forming that has to be applied, the beam-form manipulated baseband signals are provided to the RF interface to Node-B module 520, which is arranged to up-convert the received RF signal to a low power RF signal for wirelessly transmitting to the Node-B or feeding to the Node-B via a co-axial cable. Thus, the wirelessly received RF signals may be processed by a conventional base-station at a tower base, e.g. a legacy Node-B.

Thus, in one embodiment of the invention, in a transmit operation the Node-B may employ low-power PAs, to the extent that the RF interface to Node-B module 520 only needs to be able to receive a wireless signal that undergoes minimal propagation loss, and down-convert the signal to baseband signals. Alternatively, in one embodiment of the invention, the modem control logic 510 may be able to provide a retro-fit solution to a legacy Node-B, namely a Node-B that uses existing high power PAs. Thus, in this alternative embodiment in a transmit operation, the RF interface to Node-B module 520 may comprise one or more attenuators arranged to attenuate the transmit RF signals to a suitable power level for down-conversion.

Thus, in contrast to known arrangements, RF signals as communicated to and from the antenna array are intersected at the tower top. In the context of embodiments of the invention, the expression 'tower top' encompasses the location just before the antenna array at the top of the antenna mast and including any enclosure adjacent to the antenna array or a beam-forming system contained within an antenna array enclosure. Tower top and antenna mast references made herein, can refer to not only dedicated antenna supporting mast structures, but may also include, building facades, roof tops, church steeples or any other physical structure used to support antenna infrastructural components.

In one embodiment of the invention, it is envisaged that the digital signal processing performed by the at least one translational and beam-forming digital signal processor (DSP) 525 may be duplicated, with a different beam weighting applied to the different beam patterns. For example, more than one receive beam pattern may be generated as the ADC signals from the individual receivers may be applied to at least one other beam-former logic element, as described in the Applicant's co-pending application Ser.No. 13/201,587 filed on the same day as the present application. The feature of multiple beam-forming and processing from this application is incorporated herein by reference. Thus, the different beam weighted signals may be utilised by a Node-B if they are output on the duplex RF cables in a different frequency to the frequency received at the antenna array.

Thus, it is possible to utilise one co-axial cable on a feedback path that comprises multiple beam patterns, where each beam pattern is sent on a different carrier frequency within the co-axial cable, in order to facilitate processing by the Node-B. These beam pattern signals sent to the Node-B on different RF channels may be processed locally by the Node-B, in order to provide beam steering information.

Alternatively, these beam pattern signals may be processed by the OMC in response to signals sent to the OMC through a network element/modem interface. In a yet further alternative embodiment, the beam pattern signals may be processed by a specific application that interfaces to the Internet and may therefore be coupled to the network element and communicate using IP.

In one embodiment of the invention, tower top control commands may be sent to a network element/modem and communicated through the live network traffic signals, either wirelessly or via the co-axial cables from the Node-B. For example, in this manner, channel and/or frequency band re-designation may be accomplished using such tower top commands. Thus, the adaptive antenna array elements 535 may be controlled by tower top control commands sent through the modem control logic 510, which may be in a form of a UE-type modem, located substantially at the antenna mast.

In one embodiment of the invention, it is envisaged that the modem control logic 510 may enable and facilitate different radio frequencies to be used for the RF link between the Node-B and RF interface to Node-B module 520 and the RF link between the RF Array processing circuits 530 and the adaptive antenna array elements 535. In this manner, the modem control logic 510 may perform different frequency translations. From an RF perspective, for example to improve isolation of RF signals between different circuits, it is not always desirable that the input and output operate at the same frequency.

In one embodiment of the invention, it is envisaged that such tower top commands may bypass the OMC operation of the network and thereby allow network optimisation independent of OMC integration of the technology.

It is also envisaged in one embodiment of the invention that remote processing of the modem control logic 510, and therefore remote processing of the elements connected to the modem control logic 510, using conventional internet protocol (IP) is possible.

Referring now to FIG. 6, a more detailed example of some embodiments of FIG. 5 is illustrated, as adapted in accordance with some embodiments of the invention. Embodiments of the invention propose an RF feed, either wireless or RF via co-axial cables between a Node-B a network element, located adjacent an antenna array with an intermediary digital active adaptive antenna array system that includes active control from a modem. Embodiments of the invention propose modem control of beam-forming and calibration of antenna arrays substantially at the top of an antenna mast. In this manner, the modem control logic utilises RF down-conversion and analogue-to-digital conversion of signals sent to circuitry located substantially at the antenna mast top from the Node-B in a transmit mode of operation, or from an antenna array to be routed to the Node-B in a receive mode of operation. The modem control logic, in one embodiment of the invention, then performs digital signal processing to effect beam-forming and/or calibration of antenna arrays in a digital domain. Thereafter, the modem control logic configures the reverse operation of the beam-formed and calibrated signals using digital-to-analogue conversion and RF up-conversion of signals, for forwarding to the antenna array in a transmit mode of operation or to the Node-B in a receive mode of operation.

The embodiment illustrated in FIG. 6 relates to a transceiver array and associated conversion allowing Node-B processing. The embodiment illustrated in FIG. 6 also details a diagram of diversity reception. Modern air interface protocols exploit antenna diversity to improve the air interface communication link. Conventional Antenna arrays contain an array of radiative antenna elements of +45° and −45° polarisation. Prior to the demodulation process these signals are processed independently. Since these are diverse paths, coherency is unlikely to exist. Therefore, the signals are not combined in the RF domain. Generally, it is sufficient to transmit in one polarisation type only. Hence, transceiver devices 634 are connected to antenna elements of one polarisation type only. Conversely, receive diversity paths 650 are processed independently.

The antenna mast located network element, e.g. a modem, comprises a plurality of parallel transceiver circuits operably coupled to an active antenna array, of whose receiver elements are arranged to individually provide down-converted digitised samples corresponding to the receive channel in question for the received signals. As will be appreciated by a skilled artisan, the transmit section is also operably connected to the antenna array. Each of the plurality of parallel transceiver circuits comprise digital to analogue conversion, 636, to generate complex baseband analogue signals. The analogue signals are filtered, 638, and frequency translated, 642, to the desired RF band. These RF signals are amplified, 644, and routed through a duplexer device, 646, in order to isolate transmit signals from the receive paths. Once amplified, the RF signals are routed to the antenna elements.

The plurality of parallel transceiver circuits comprise, in a receive mode, an antenna duplexer 646 providing a received signal to a low-noise amplifier (LNA).

The LNA provides amplified versions of the received signals to respective quadrature ('I' and 'Q') down-conversion stages arranged to down-convert the respective amplified received signals based to a frequency down-conversion signal. Down conversion signals are fed in quadrature format from a local oscillator generation sub-system. The respective quadrature down-converted amplified received signals are input to respective low-pass filters and thereafter to respective analogue-to-digital converters to transform the quadrature down-converted received signal to a digital form.

Likewise, for receive diversity processing, each of a plurality of parallel receiver circuits 650 comprise, in a receive mode, a receive band-pass filter 652 providing a received signal to a low-noise amplifier (LNA), 654.

The LNA 654 provides amplified versions of the received signals to respective quadrature and 'Q') down-conversion stages 656 arranged to down-convert the respective amplified received signals to a frequency down-converted signal. Down converted signals are fed in quadrature format from a local oscillator generation sub-system, 658. The respective quadrature down-converted amplified received signals are input to respective low-pass filters 660 and thereafter to respective analogue-to-digital converters 662 to transform the quadrature down-converted received signal to a digital form.

In accordance with embodiments of the invention, the digital form of the various received signals of a single polarisation type is input to a plurality of parallel beam-form processing logic modules. Beam-forming processing involves application of phase and amplitude scaling of each individual receive signal that corresponds to a beam pattern co-efficient.

Each of the plurality of parallel beam-form processing logic modules comprise respective logic arranged to process beam-forming and subsequent channel filtering.

The parallel beam-form processing logic modules process the received digital form of the signals using respective channel filters and provide output signals. Each of the digital output signals in 'I' and 'Q' format will be additively combined (614, 616).

Likewise diversity receive path processing independently undergoes the same transformational process.

The output of the beam-forming process results in digital signal type corresponding to signals received substantially within the processed beam formation. These digital signals are converted to analogue format and up-converted to produce a signal in the frequency band that can be further processed by the Node-B.

It is envisaged that attenuation (not shown) may be introduced on the respective co-axial cables or on the receive side of the Node-B to RF interface, so as to provide signals within an acceptable dynamic range for the respective signal processing chains of the Node-B to RF interface. In addition, it is envisaged that power management functions and clock generation functions may be used, but are not shown in the diagrams for the sake of simplicity.

In accordance with one embodiment of the invention, diversity receive paths may be re-transmitted to the Node-B, which in one embodiment is a legacy Node-B. In one example embodiment, the antenna array system may comprise of one or more cross-polarised antenna elements. In this manner, antenna elements of one polarisation type may be processed by the Node-B through a separate diversity receiver, with the diversity signal relayed back to the Node-B on a separate re-transmission path.

In one example embodiment, it is envisaged that system-wide enhancements may be achieved. For example, embodiments of the invention may 'locally' monitor information relating to the cell environment, and this information may be passed to the system's existing OMC independent from other OMC traffic, in order for the OMC to effect system-wide changes. Furthermore, for example, signals may be received from each of the antenna elements of the antenna array, where each signal is regenerated into a single antenna feed. In this example, the regenerated signal information may be processed in such a way that some of the network environmental information may be lost. In conventional antenna arrays no spatial environmental information can be derived, thus processing this information yields benefits over conventional systems.

Incoming RF signals that are incident on the antenna array may have an Angle of Arrival (AoA) calculated. These may be determined by the controller logic in conjunction with the active beam-former logic modules. Thus, information from a wide-angle beam may be relayed back to the Node-B or OMC.

However, in order to assist network optimisation, it is known that there may be statistically more signals coming from a narrower angle of arrival on an antenna array. This information may be statistically processed from the signal received on the individual antenna elements. In this example, it is envisaged that this information may be relayed back to the OMC using, for example IP messages via the network element/modem. In response to these IP messages, the OMC may be able to adjust network parameters, such as beam direction and beam-form Azimuth pattern type. Alternatively, or additionally, the OMC may use such information to change uplink or down link pattern types, for example to better optimise or plan the network. OMC instructions can be relayed using such an IP modem.

Referring now to FIG. 7, an example of a method 700 for performing beam-forming of an antenna array in a wireless communication system is illustrated in accordance with embodiments of the invention. The method commences with power-up of the circuitry (e.g. network element) on the antenna mast, as shown in step 705. The modem control logic, for example modem control logic 510 of FIG. 5, detects its home network, as shown in step 710. The network element, which may be in a form of a UE modem device, may be connected to the Node-B via the RF interface to the tower top. This UE modem device may be configured to run on a particular Operator's network and its Universal Subscriber Identity Module (USIM) may be used to configure as such. Unless the UE modem detects that the Node-B that it is connected to is a home network, then it cannot proceed and process another network signals.

Next, an internet protocol (IP) call may be initialised to an OMC controller, as shown in step 715. Once an IP call has been established, the modem control logic is able to download configuration information as shown in step 720. The modem control logic then closes the loop on the reference clock generation (UE modem or GPS), as shown in step 725.

3GPP-based radio interfaces demand 50 parts per billion (ppb) accuracy on transmit radio signals. Thus, before live transmission can commence, reference clock generation used by the respective local oscillators on transmit and receive paths needs to be at this accuracy level, or better. Quartz crystal oscillators of various forms would not be able to achieve this accuracy on their own. To achieve this clock reference accuracy, clock(s) need to be controlled using an external reference, either the Node-B transmitter via the modem, or the use of a GPS receiver to correct the clock.

The modem control logic then configures the beam-form and transceiver modules (for example the RF Interface to Node-B module 520 and RF Array processing circuits 530 of FIG. 5) as shown in step 730. The modem control logic then configures the backhaul to the Node-B transmitter and transceiver modules, as shown in step 735. The modem control logic then configures to ramp transmit signals to the antenna array elements, as in step 740. The modem control logic then runs a calibration routine for the beam-former, as shown in step 745. The modem control logic then monitors two states: one of which is IP command traffic from the modem, in step 750 and the second state of which is the calibration status state, as shown in step 755.

Furthermore, state 755 checks whether a calibration routine is scheduled to start. If IP command traffic requires servicing, this state is entered on detection of an interrupt, 770. Thus, the state machine can be exited when the appropriate modem IP command is issued.

Referring now to FIG. 8, a flowchart example 800 of a Node-B transmit signal processing flow for performing beam-forming of an antenna array in a wireless communication system is illustrated in accordance with some embodiments of the invention. The flowchart 800 commences with signals being received from a Node-B transmitter and down-converted (for example by RF Interface to Node-B module 520 of FIG. 5), as shown in step 805. Next, in step 810, the received down-converted signals are digitised to quadrature (10) samples, (for example also by RF Interface to Node-B module 520 of FIG. 5), as shown in step 810.

Multiple IQ signal pairs are then generated by modifying the down converted IQ signal with separate composite Beam and corrective calibration complex gains per transmit path, (for example by the at least one translational and beam-forming digital signal processor (DSP) 525 of FIG. 5), as shown in step 815. The modified signals are then scaled (for example by the at least one translational and beam-forming digital signal processor (DSP) 525 of FIG. 5) such that the signal level of the modified signals falls within an expected range of the Transmitting Node-B, as shown in step 820.

Thereafter, the scaled modified signals are converted to analogue IQ signal pairs on each of the transmit path elements, for example by the at least one translational and beam-forming digital signal processor (DSP) 525 of FIG. 5, as shown in step 825. Thereafter, the analogue IQ signal pairs are up-converted to IQ signals at a channel frequency for the Node-B transmit operation for example by RF Array processing circuits 530 of FIG. 5, as shown in step 830, and passed to adaptive antenna array elements, for example adaptive antenna array elements 535 of FIG. 5.

Referring now to FIG. 9, an example flowchart of a receive signal processing flow for an antenna mast control element performing beam-forming of an antenna array in a wireless system adapted in accordance with some embodiments of the invention is illustrated. The method commences with the antenna mast control element digitizing received and down-converted signals from individual antenna elements, as shown in step 905. Next, the antenna mast control element applies a composite beam and corrective calibration complex gain factor to each array element I-Q signal, as shown in step 910. Next, the antenna mast control element sums all 'I' and sums all 'Q' values of the signals from each of the individual antenna elements, as shown in step 915. Then, the antenna mast control element scales the signals to within an expected range of the receiving Node-B, as shown in step 920 and converts the scaled digital signals to analog I-Q signals as shown in step 925. The antenna mast control element then up-converts the analog I-Q signals to a particular channel frequency for the Node-B to receive the up-converted analog I-Q signals, as shown in step 930.

Referring now to FIG. 10, there is illustrated a typical computing system 1000 that may be employed to implement signal processing functionality in embodiments of the invention. Computing systems of this type may be used in access points and wireless communication units. Those skilled in the relevant art will also recognize how to implement the invention using other computer systems or architectures. Computing system 1000 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1000 can include one or more processors, such as a processor 1004. Processor 1004 can be implemented using a general or special-purpose processing engine such as, for example, a microprocessor, microcontroller or other control logic. In this example, processor 1004 is connected to a bus 1002 or other communications medium.

Computing system 1000 can also include a main memory 1008, such as random access memory (RAM) or other dynamic memory, for storing information and instructions to be executed by processor 1004. Main memory 1008 also may be used for storing temporary variables or other intermediate information during execution of instructions to be executed by processor 1004. Computing system 1000 may likewise include a read only memory (ROM) or other static storage device coupled to bus 1002 for storing static information and instructions for processor 1004.

The computing system 1000 may also include information storage system 1010, which may include, for example, a media drive 1012 and a removable storage interface 1020. The media drive 1012 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1018 may include, for example, a hard disk, floppy disk, magnetic tape, optical disk, CD or DVD, or other fixed or removable medium that is read by and written to by media drive 1012. As these examples illustrate, the storage media 1018 may include a computer-readable storage medium having particular computer software or data stored therein.

In alternative embodiments, information storage system 1010 may include other similar components for allowing computer programs or other instructions or data to be loaded into computing system 1000. Such components may include, for example, a removable storage unit 1022 and an interface 1020, such as a program cartridge and cartridge interface, a removable memory (for example, a flash memory or other removable memory module) and memory slot, and other removable storage units 1022 and interfaces 1020 that allow software and data to be transferred from the removable storage unit 1018 to computing system 1000.

Computing system 1000 can also include a communications interface 1024. Communications interface 1024 can be used to allow software and data to be transferred between computing system 1000 and external devices. Examples of communications interface 1024 can include a modem, a network interface (such as an Ethernet or other NIC card), a communications port (such as for example, a universal serial bus (USB) port), a PCMCIA slot and card, etc. Software and data transferred via communications interface 1024 are in the form of signals which can be electronic, electromagnetic, and optical or other signals capable of being received by communications interface 1024. These signals are provided to communications interface 1024 via a channel 1028. This channel 1028 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1008, storage device 1018, or storage unit 1022. These and other forms of computer-readable media may store one or more instructions for use by processor 1004, to cause the processor to perform specified operations. Such instructions, generally referred to as 'computer program code' (which may be grouped in the form of computer programs or other groupings), when executed, enable the computing system 1000 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1000 using, for example, removable storage drive 1022, drive 1012 or communications interface 1024. The control logic (in this example, software instructions or computer program code), when executed by the processor 1004, causes the processor 1004 to perform the functions of the invention as described herein.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A network element for a wireless communication system locatable to couple at least one base station to an antenna array, wherein the network element comprises:
   at least one receiver arranged to receive a radio frequency signal from the at least one base station or the antenna array;
   radio frequency conversion circuitry arranged to down-convert a received radio frequency signal to a baseband signal;
   analogue-to-digital conversion logic arranged to convert the baseband signal to digitized signals;
   beam-form processing logic arranged to perform active beam-forming adjustment on the digitized signals;
   digital-to-analogue conversion logic arranged to convert the beam-form adjusted digitized signals to analogue signals;
   radio frequency conversion circuitry arranged to up-convert the analogue signals to a radio frequency radio signal for forwarding to the at least one base station or antenna array; wherein the network element further comprises a wireless modem operably coupled to the beam-form processing logic and arranged to receive and process at least one command received wirelessly in response thereto perform beam-forming adjustment on the digitized signals.

2. The network element of claim 1, wherein the wireless modem is arranged to receive and process at least one command received wirelessly via live network air interface traffic applied to the at least one receiver in order to perform beam-forming adjustment on the digitized signals.

3. The network element of claim 1, wherein the wireless modem comprises control logic arranged to support a plurality of radio frequency channels corresponding to a plurality of different beam patterns.

4. The network element of claim 2, wherein the wireless modem is arranged to independently process polarization diversity receive signals.

5. The network element of claim 1, wherein the network element is adapted to receive multiple transmissions from multiple base stations where the multiple transmissions are wirelessly combined.

6. The network element of claim 1, wherein the network element is located at a top of an antenna mast.

7. The network element of claim 1, wherein the wireless modem comprises logic for communicating with at least one other network element in a wireless communication infrastructure using an air interface protocol.

8. The network element of claim 1, wherein the wireless modem comprises logic for providing real-time feedback to the at least one base station of the effects of beam-forming.

9. The network element of claim 8, wherein the real-time feedback to the at least one base station comprises a diversity signal.

10. The network element of claim 8, wherein the logic for providing real-time feedback to the at least one base station comprises logic for determining at least one from a group of: failure detection, angle of arrival of a received wireless signal, operating temperature of a device contained in the network element.

11. The network element of claim 1, wherein the network element is arranged to support separate radio frequency channels to be used in parallel to live traffic channels to relay antenna array beam-forming information to the wireless modem.

12. The network element of claim 1, wherein the wireless modem comprises control elements arranged to effect beam-form profiles to be deployed on transmit and/or receive antenna radiating element of the antenna array.

13. The network element of claim 12, wherein the control elements comprise elements to effect adjustment of at least one from a group of: pan and tilt, for the antenna array.

14. The network element of claim 1, wherein the network element comprises signal conversion gain elements located on respective radio frequency paths to ensure that signals transmitted to the at least one base station are maintained within a correct dynamic range.

15. The network element of claim 1, wherein the network element comprises a separate transmit and receive communication link to the at least one base station.

16. The network element of claim 1, wherein the network element comprises a wireless communication link to the at least one base station.

17. The network element of claim 16, wherein the network element comprises a low-power power amplifier arranged to transmit low power wireless signals to the at least one base station on the wireless communication link.

18. A method for antenna array beam-forming by a network element located between an antenna array and at least one base station in a wireless communication system and comprising a wireless modem, wherein the method comprising the steps of:

receiving a radio frequency signal from the at least one base station or the antenna array;

performing radio frequency conversion to down-convert a received radio frequency signal to a baseband signal;

performing analogue-to-digital conversion to convert the baseband signal to digitized signals;

receiving and processing at least one command received wirelessly by the wireless modem;

performing in response to the at least one wireless command, active beam-forming adjustment on the digitized signals;

performing digital-to-analogue conversion to convert the beam-form adjusted digitized signals to analogue signals; and up-converting the analogue signals to a radio frequency radio signal for forwarding to the antenna array or the at least one base station.

19. A method for antenna array beam-forming as in claim 18, wherein the method is embodied in a non-transitory tangible computer program product comprising executable program code stored thereon by a network element located between an antenna array and at least one base station in a wireless communication system.

20. A communication system having a network element locatable to couple at least one base station to an antenna array, wherein the network element comprises:

at least one receiver arranged to receive a radio frequency signal from the at least one base station or the antenna array;

radio frequency conversion circuitry arranged to down-convert a received radio frequency signal to a baseband signal;

analogue-to-digital conversion logic arranged to convert the baseband signal to digitized signals;

beam-form processing logic arranged to perform active beam-forming adjustment on the digitized signals;

digital-to-analogue conversion logic arranged to convert the beam-form adjusted digitized signals to analogue signals;

radio frequency conversion circuitry arranged to up-convert the analogue signals to a radio frequency radio signal for forwarding to the antenna array or the at least one base station; and wherein the network element further comprises a wireless modem operably coupled to the beam-form processing logic and arranged to receive and process at least one wireless command and in response thereto perform beam-forming adjustment on the digitized signals.

* * * * *